(12) United States Patent
Gupta et al.

(10) Patent No.: US 12,106,408 B2
(45) Date of Patent: Oct. 1, 2024

(54) CONTENT-ADAPTIVE TUTORIALS FOR GRAPHICS EDITING TOOLS IN A GRAPHICS EDITING SYSTEM

(71) Applicant: ADOBE INC., San Jose, CA (US)

(72) Inventors: Subham Gupta, Roorkee (IN); Krishna Singh Karki, Patparganj (IN); Poonam Bhalla, New Delhi (IN); Ajay Bedi, Hamirpur (IN)

(73) Assignee: Adobe Inc., San Jose, CA (US)

( * ) Notice: Subject to any disclaimer, the term of this patent is extended or adjusted under 35 U.S.C. 154(b) by 85 days.

(21) Appl. No.: 17/064,231

(22) Filed: Oct. 6, 2020

(65) Prior Publication Data

US 2022/0108506 A1    Apr. 7, 2022

(51) Int. Cl.
| | |
|---|---|
| *G06T 11/60* | (2006.01) |
| *G06F 9/451* | (2018.01) |
| *G06K 9/00* | (2022.01) |
| *G06V 40/16* | (2022.01) |

(52) U.S. Cl.
CPC .............. *G06T 11/60* (2013.01); *G06F 9/453* (2018.02); *G06V 40/165* (2022.01); *G06V 40/171* (2022.01); *G06T 2200/24* (2013.01)

(58) Field of Classification Search
CPC ..... G06T 11/60; G06T 2200/24; G06F 9/453; G06V 40/171; G06V 40/165
See application file for complete search history.

(56) References Cited

U.S. PATENT DOCUMENTS

| | | | | |
|---|---|---|---|---|
| 9,704,231 B1 * | 7/2017 | Kulewski | ............... | G06V 20/10 |
| 10,628,185 B1 * | 4/2020 | Gupta | ................... | G06F 3/0481 |
| 10,818,058 B1 * | 10/2020 | Gupta | .................. | G11B 27/031 |
| 11,119,727 B1 * | 9/2021 | Gupta | ..................... | G10L 25/48 |

(Continued)

FOREIGN PATENT DOCUMENTS

CN             104731446 A      6/2015

OTHER PUBLICATIONS

Office Action received for Chinese Patent Application No. 202110831929.9, mailed on Aug. 15, 2024, 26 pages (13 pages of Original OA and 13 pages of English Translation).

*Primary Examiner* — Stephen S Hong
*Assistant Examiner* — Carl E Barnes, Jr.
(74) *Attorney, Agent, or Firm* — Shook, Hardy & Bacon L.L.P.

(57) ABSTRACT

Methods, systems, and computer storage media for providing tool tutorials based on tutorial information that is dynamically integrated into tool tutorial shells using graphics editing system operations in a graphics editing systems. In operation, an image is received in association with a graphics editing application. Tool parameters (e.g., image-specific tool parameters) are generated based on processing the image. The tool parameters are generated for a graphics editing tool of the graphics editing application. The graphics editing tool (e.g., object removal tool or spot healing tool) can be a premium version of a simplified version of the graphics editing tool in a freemium application service. Based on the tool parameters and the image, a tool tutorial data file is generated by incorporating the tool parameters and the image into a tool tutorial shell. The tool tutorial data file can be selectively rendered in an integrated interface of the graphics editing application.

20 Claims, 12 Drawing Sheets

(56) References Cited

U.S. PATENT DOCUMENTS

| | | | |
|---|---|---|---|
| 2002/0168616 A1* | 11/2002 | Chan | G09B 7/02 |
| | | | 434/118 |
| 2004/0199901 A1* | 10/2004 | Chapman | G09B 7/02 |
| | | | 717/114 |
| 2007/0015118 A1* | 1/2007 | Nickell | G09B 7/02 |
| | | | 434/118 |
| 2013/0179256 A1* | 7/2013 | Farrell | G06Q 50/184 |
| | | | 705/14.49 |
| 2015/0178965 A1 | 6/2015 | Edwin et al. | |
| 2017/0032551 A1* | 2/2017 | Fried | G06V 10/462 |
| 2018/0260718 A1* | 9/2018 | Biswas | G06F 16/24578 |
| 2019/0287197 A1* | 9/2019 | Chang | G09B 5/02 |
| 2020/0082586 A1* | 3/2020 | Jindal | G06F 9/453 |
| 2020/0167893 A1* | 5/2020 | Gupta | G06V 40/165 |
| 2021/0118325 A1* | 4/2021 | Gupta | G06T 13/80 |
| 2022/0108506 A1* | 4/2022 | Gupta | G06F 9/453 |

\* cited by examiner

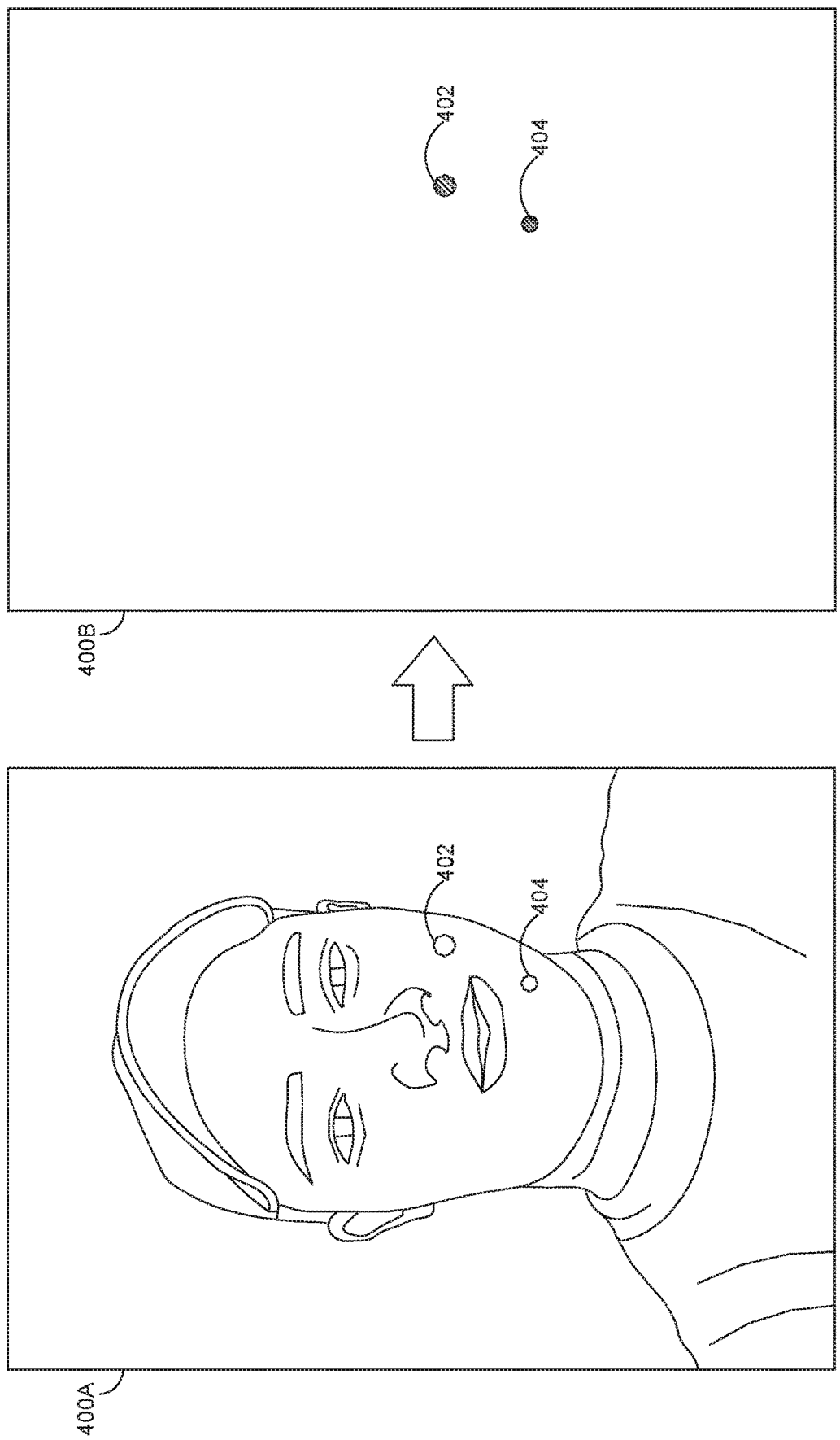

```
600
<crs:RetouchAreas>  ~602
    <rdf:Seq>
        <rdf:li rdf:parseType="Resource">
            <crs:SpotType>heal</crs:SpotType>
            <crs:SourceState>sourceAutoComputed</crs:SourceState>
            <crs:Method>gaussian</crs:Method>
            <crs:HealVersion>+2</crs:HealVersion>
            <crs:SourceX>0.463624</crs:SourceX>  ~604
            <crs:OffsetY>0.719907</crs:OffsetY>  ~606
            <crs:Opacity>1.000000</crs:Opacity>
            <crs:Feather>0.350000</crs:Feather>
            <crs:Seed>+2</crs:Seed>
            <crs:Masks>
                <rdf:Seq>
                    <rdf:li rdf:parseType="Resource">
                        <crs:What>Mask/Ellipse</crs:What>
                        <crs:MaskValue>1.000000</crs:MaskValue>
                        <crs:X>0.471065</crs:X>
                        <crs:Y>0.638889</crs:Y>
                        <crs:SizeX>0.019753</crs:SizeX>  ~608
                        <crs:SizeY>0.019753</crs:SizeY>  ~610
                        <crs:Alpha>0.000000</crs:Alpha>
                        <crs:CenterValue>1.000000</crs:CenterValue>
                        <crs:PerimeterValue>0.000000</crs:PerimeterValue>
                    </rdf:li>
                </rdf:Seq>
            </crs:Masks>
        </rdf:li>
    </rdf:Seq>
</crs:RetouchAreas>
```

```
{
"header" : {
"author" : "Lightroom Education Team",
"difficulty": "beginner",
"header_text_list" : [ "$$$/Tutorial/80b9f9eb-0cf9-4429-829f-14e7dddbbce9/Header/Description=Learn how to use the
Healing Brush to remove unwanted skin blemishes." ],
"image_before" : "proxy_2560.dng",
"image_after" : "rendition_2048.jpg",
"title" : "$$$/Tutorial/80b9f9eb-0cf9-4429-829f-14e7dddbbce9/Header/Title=Healing",
"lr_acr_process_version" : "11.0",
"tutorial_type" : "SEQ-PROC",
}, "proc_list" : [ {
"proc_name" : "$$$/Tutorial/80b9f9eb-0cf9-4429-829f-14e7dddbbce9/Chapter/1/Name=Healing",
"proc_overview_text" : "$$$/Tutorial/80b9f9eb-0cf9-4429-829f-14e7dddbbce9/Chapter/1/OverviewText=The Healing
brush is a powerful tool for removing distractions by painting over the unwanted spot to then use information from another
part of the photo to clone or heal away the distraction.",
"proc_rule" : "ALL",
"proc_id" : "721ac357-9432-49ea-bbbd-0bdb4ada2732",
"proc_step_list" " [ {
"step_sentence_list" : [ {
"step_node_id" : "44f3e296-0f4a-4a19-b794-26c430cda2df",        302
"step_node_type" : "info",
"step_sentence_text" : "$$$/Tutorial/80b9f9eb-0cf9-4429-829f-14e7dddbbce9/Chapter/1/Step/1/SentenceText=The
Healing Brush can be set to Clone, which copies pixels from the source to the selected target, or Heal, which blends the
Source pixels with the pixels surrounding the target being replaced. Heal works best for most jobs.",
} ]
}, {
"step_sentence_list" : [ {
"step_node_id" : "551eaca1-6df3-4f1a-8f65-87cde2b1f6f4",
"step_node_type" : "heal-mask-create",
"step_sentence_text" : "$$$/Tutorial/80b9f9eb-0cf9-4429-829f-
14e7dddbbce9/Chapter/1/Step/2/SentenceText=Click on the highlighted blemish region of the face.",
"step_sentence_object_candidates" : [ {
"pftObjectType" : "CRTool",
"pftObjectName" : "spotheal-0/mask-0",
"pftObjectId" : "XMP",                                          304
"pftValue":
"{\"crs:What\":\"Mask/Ellipse\",\"crs:X\":\"0.471065\",\"crs:Y\":\"0.638889\",\"crs:SizeX\":\"0.19753\",\"crs:S
izeY\":\"0.019753\",\"crs:MaskValue\":\"1.000000\",\"crs:Alpha\":\"0.000000\",\"crs:CenterValue\":\"1.000000
\",\"crs:PerimeterValue\":\"0.000000\"}"
} ]
}, {
"step_sentence_list" : [ {
"step_node_id" : "5e5ccfd8-c746-4112-95ea-ef2098e60f66",
"step_node_type" : "heal-source-create",
"step_sentence_text" : "$$$/Tutorial/80b9f9eb-0cf9-4429-829f-
14e7dddbbce9/Chapter/1/Step/3/SentenceText=Move the source spot to the area indicated for a good sample
Region that will perfectly blend with the blemish region.",
"step_sentence_object_candidates" : [ {
"pftObjectType" : "CRTool",
"pftObjectName" : "spotheal-0/source",
"pftObjectId" : "XMP",
"pftValue" :
"{\"crs:SpotType\":\"heal\",\"crs:SourceState\":\"sourceSetExplicitly\",\"crs:Method\":\"gaussian\",\"crs:HealVe
rsion\":\"+2\",\"crs:SourceX\":\"0.463624\",\"crs:OffsetY\":\"0.719907\",\"crs:Opacity\":\"1.000000\",\"crs:Feat
her\":\"0.350000\",\"crs:Seed\":\"+2\"}"
} ]
}, {
"step_sentence_list" : [ {
"step_node_id" : "8fe757a0-7cb3-4d05-a919-fd598f595641",
"step_node_type" : "info",
"step_sentence_text" : ""$$$/Tutorial/80b9f9eb-0cf9-4429-829f-
14e7dddbbce9/Chapter/1/Step/17/SentenceText=In case you do not like the results of a Heal step, tap the
Trashcan to delete the less successful heal and try again."
} ]
} ]
} ]
}
```

610 — GENERATE TOOL PARAMETERS BASED ON ANALYZING AN IMAGE, WHEREIN GENERATING THE TOOL PARAMETERS IS BASED ON EXECUTING A SET OF PROCESSING STEPS OF A GRAPHICS EDITING TOOL ASSOCIATED WIITH A GRAPHICS EDITING APPLICATION

620 — ACCESSING A TOOL TUTORIAL SHELL, WHEREIN THE TOOL TUTORIAL SHELL IS IN A PORTABLE TUTORIAL FORMAT COMPRISING CHAPTERS AND SECTIONS OF TUTORIAL STEPS

630 — GENERATING A TOOL TUTORIAL DATA FILE BASED ON MAPPING THE TUTORIAL STEPS TO THE TOOL PARAMETERS AND IMAGE DATA OF THE IMAGE

FIG. 6

CONTENT-ADAPTIVE TUTORIALS FOR GRAPHICS EDITING TOOLS IN A GRAPHICS EDITING SYSTEM

BACKGROUND

Users often rely on graphics editing systems (e.g., desktop and cloud-based photo editing applications) for editing and creating digital graphics (or images). Such graphics editing systems include editing tools that support a variety of image-editing functions. Users, in particular, use editing tools to edit images and improve aspects of the image. By way of example, a healing brush is a tool that is used to remove distractions, such as, skin blemishes or unwanted spots from a photograph. However, a graphics editing system with a large set of complex editing tools, while powerful, creates a steep learning curve for beginners of the graphics editing system. As such, users need to have the ability to quickly understand how to use the set of editing tools of a graphics editing systems.

By way of context, a graphics editing system can specifically be a freemium-based application or service having free editing tools and premium editing tools. In particular, the premium editing tools are accessible after the user has paid for a subscription to the application or service. Unfortunately, because of the additional complexity of the premium editing tools, it is difficult to effectively on-board new users to premium editing tools. In general, providing tutorials to assist users with understanding premium editing tools, or editing tools generally, greatly affect the productivity and efficiency of creating and editing digital graphics. Conventional systems are limited in providing relevant guidance (e.g., tutorials and workflows) that support educating users on editing tools because the current guidance include statically-defined guidance features. With the increasing use of digital graphics, improved tools tutorials for graphics editing systems can be leveraged to efficiently and effectively use editing tools in graphics editing systems.

SUMMARY

Embodiments of the present disclosure are directed towards providing tool tutorials based on tutorial information that is dynamically integrated into tool tutorial shells. For example, a tool tutorial for a spot healing tool (i.e., an object removal tool) is generated using the following: a user-selected image, spot healing tool parameters generated based on the user-selected image, and a spot healing tool tutorial shell (e.g., a portable tutorial document shell). Automatically generating the tool tutorial can be in the context of exposing a user to a premium editing tool for a freemium application or service. The user is exposed to the premium editing tool along with a content-adaptive tutorial for the premium editing tool ("tool tutorial"). The tool tutorial includes the user's content (e.g., tutorial information including image data) and tool parameters generated for the user's content, which are automatically incorporated into a tool tutorial shell to improve the user's understanding and adoption of the premium tool.

In operation, content-adaptive tutorials "tool tutorials" for graphics editing tools are generated using graphics editing system operations in a graphics editing system. The graphics editing system includes a graphics editing engine and a graphics editing client supporting a graphics editing application. The graphics editing engine processes input data (e.g., image data), tool parameters, and tool tutorial shells to automatically generate the tool tutorials. The tool tutorials are specifically generated based on tool parameters of an editing tool, where the tool parameters are derived for an image using a tool workflow (i.e., a set of processing steps) of the editing tool. Based on input data, the graphics editing engine generates a tool tutorial data file (e.g., a portable tutorial document). The tool data file is caused to be rendered in a tool tutorial interface that is integrated with the graphics editing application. The tool tutorial data file can also be selectively rendered specifically when the user meets a set of pre-defined conditions.

BRIEF DESCRIPTION OF THE DRAWINGS

FIGS. 2A-2F are illustrations of an example graphics editing system processing data for providing graphics editing system operations, in accordance with aspects of the technology described herein;

FIG. 3 is an illustration of an example graphics editing system tool tutorial data file for providing graphics editing system operations, in accordance with aspects of the technology described herein;

FIG. 6 provides a third example method of providing graphics editing system operations, in accordance with aspects of the technology described herein.

DETAILED DESCRIPTION

Definitions of Terms

Figure 1A:
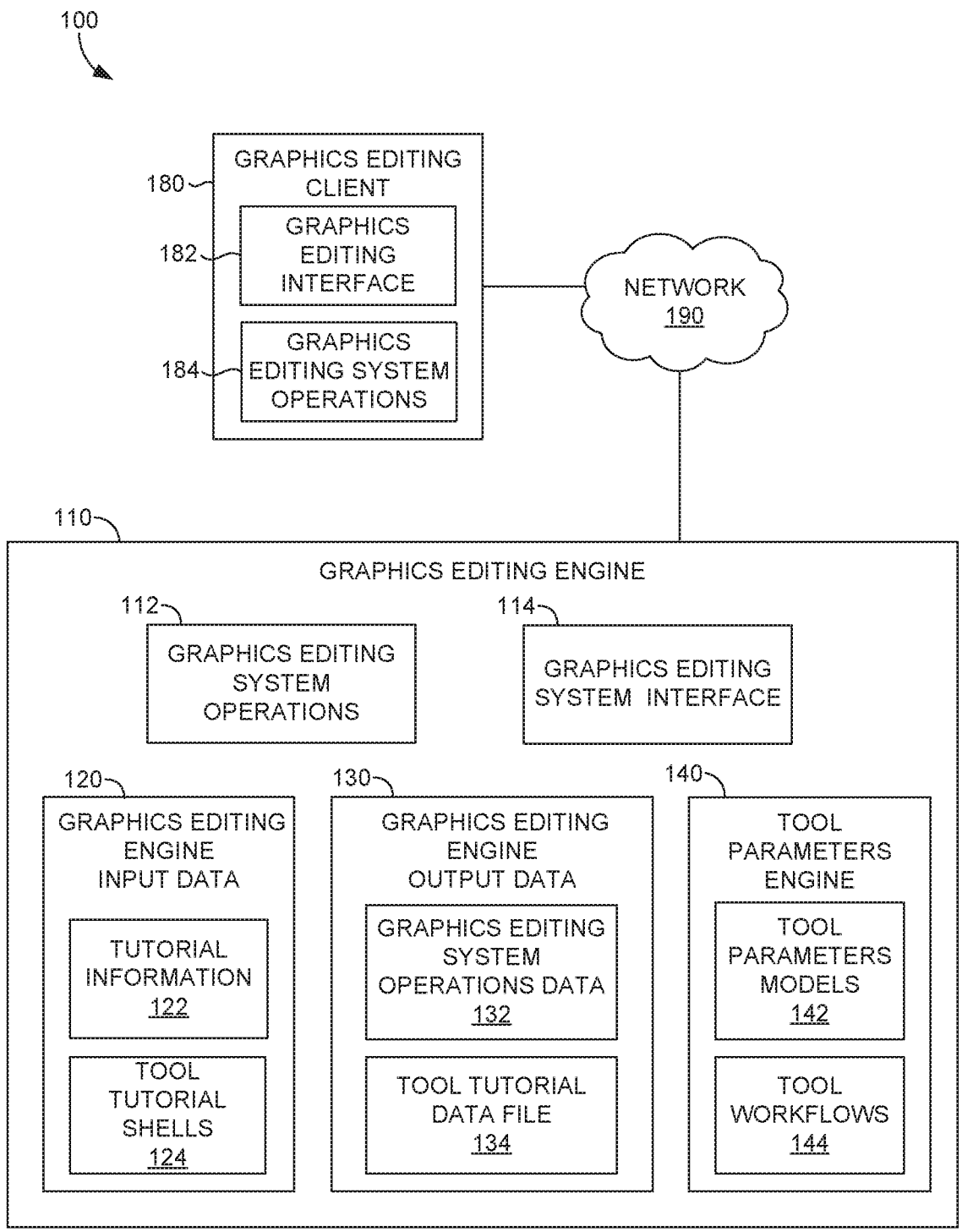
FIGS. 1A and 1B illustrate block diagrams of graphics editing systems for providing graphics editing system operations, in which embodiments described herein may be employed.

Various terms and phrases are used herein to describe embodiments of the present invention. Some of the terms and phrases used herein are described here, but more details are included throughout the description.

As used herein, the term "graphics editing system" includes a graphics editing application or service (e.g., cloud-service app, mobile apps and desktop apps) and functional components. Applications or services generally refer to software that is downloaded to a client or software that runs on a server (e.g., web application) that is accessed using a client. In this regard, applications and services can include client-deployed and server-side software. For example, the graphics editing system can be a set of applications or services that gives subscribers access to a collection of software. The software can specifically support graphic design and photography along with a set of mobile applications and also some optional cloud services. The cloud applications or services can be based on a freemium application service model that is a pricing strategy by which an application or service is provided free or charge, but money (a premium) is charged for additional features. A graphics editing system or application in this model can support a set of free editing tools and another set of premium editing tools. A provider of the cloud application or service can track usage data of the cloud applications or services.

As used herein a "graphics editing tool" or "tool" of a graphics editing system is a feature of the graphics editing system that supports image-editing functions. Users, in particular, use editing tools to edit images and improve aspects of the image. By way of example, a healing brush is a tool that is used to remove distractions, such as, skin blemishes or unwanted spots from a photograph. However, a graphics editing system with a large set of complex editing tools, while powerful, creates a steep learning curve for beginners of the graphics editing system.

As used herein, the term "tutorial information" refers to information that can be used for generating or rendering tool tutorials. Tutorial information can be received directly from the user (e.g., image data) or indirectly (e.g., subscription information or user usage data). Tutorial information can be dynamically incorporated into tools tutorials to customize and personalize a tool tutorial for a particular user. The tutorial information can be processed through a tool workflow (i.e., a set of processing steps of the tool) to generate tool parameters that are associated with the tutorial information. For example, the user's name, location, and other user data along with a user-selected photograph, photograph metadata, and other metadata can be processed through the processing steps of an editing tool (e.g., a spot healing tool) to generate the tool parameters, such that, the tool parameters are used for developing a tool tutorial.

As used herein, the term "tool parameters" refers to measurable identifiers having quantified values for a tool workflow step, where a tool parameter can have other variable quantities. For example, if an object removal tool includes a first step for detecting a face, a second step for pruning a face, and a third step of detecting a spot on the face, and so on, the corresponding tool parameters (e.g., size, offset in x and y axes, perimeter, opacity, gaussian, etc.) can have values associated with the steps for a particular image. The tool parameters and corresponding value can have placeholders in a tool tutorial shell, such that that the tool parameters are incorporated into the tool shell for adaptive generating a tool tutorial data file.

As used herein, a "tool tutorial" can refer to a computer program that supports assisting users in learning how to user the tools of a graphics editing systems. A tool tutorial supports transferring knowledge of using editing tools and may be used as part of a learning process for the graphics editing system. Different types of tool tutorials exist, for example, video tutorials, interactive tutorials, and webinars.

As used herein, a "tool workflow" refers to a set of processing steps that are used to implement a tool. For example, a spot healing tool can have a spot healing tool workflow with processing steps (e.g., face detection, facial landmark identification, skin area pruning, etc.) The tool workflow is a set of processing steps that are used to generate tool tutorial parameters that along with tutorial information are dynamically incorporated into tool tutorials. The tool workflow processing steps can be incremental editing steps that support performing a final edit operation of the tool. It is contemplated that tool workflows can be implemented based on machine learning models. In this regard, the machine learning model that is part of the tool workflow itself (e.g., deep learning model used to identify spots on a face in an image) can be used in generating parameters.

As used herein, the term "tool tutorial data file" refers to an output file generated based on dynamically incorporating tutorial information and tool parameters into a tool tutorial. The tutorial information and tool parameters can be specifically incorporated into a tool tutorial shell. The tool tutorial shell refers to a structured document or representation of the tool tutorial data file prior to incorporating the tutorial information into tool parameters (i.e., adaptive tutorial content). The tool tutorial data file can be a PTF (Portable Tutorial Format) which can be used across different types of graphics editing systems. The tool tutorial file includes distinct portions (e.g., chapters and sections) where each distinct portion can be manipulated based on the tool workflow. In particular, the tool workflow processing steps can be mapped to specific distinct portions of the tool tutorial (e.g., a one-to-one mapping between processing steps and tutorial steps that include corresponding tool parameters). For example, tool workflow processing step for a spot healing tool can include face identification, as such, a face is identified in a user-selected image. The identified face and face identification parameters are tool parameters for the spot healing tool. The tool parameters are used to generate a customized tool tutorial, for example, the tool parameters are incorporated into a tool tutorial shell to generate a tool tutorial data file. The tool tutorial data file may be appended with additional information (e.g., additional informative steps) at the end of the tool tutorial data, which allows users to continue editing the image.

Overview

By way of background, users often use graphics editing systems (e.g., desktop and cloud-based photo editing applications) for editing and creating digital graphics (or images). Such graphics editing systems can include editing tools that support a variety of image-editing functions. Users, in particular, use editing tools to edit images to improve aspects of the image. By way of example, a healing brush can be a tool used to remove distractions, such as, skin blemishes or unwanted spots from a photograph. Users can remove the distractions by painting over the unwanted objects and then use information from another part of the photograph to clone or heal away the distraction. Users can adjust the brush properties such as size, feather, and opacity to accurately select and fix an unwanted region.

A graphics editing system can specifically be freemium-based application or service having free editing tools and premium editing tools, where the premium tools are accessible only after the user has paid for access to the premium editing tools. Unfortunately, because of the additional complexity of the premium editing tools, it can be difficult to effectively on-board new users to premium editing tools and services. Conventional systems are limited in providing relevant guidance (e.g., tutorials and interfaces) that support educating users on editing tools because the current guidance include statically-defined guidance features. For example, a graphics editing system can include an interactive tutorial sections, where the tutorials include guided assistance based on a set of pre-identified photographs. However, the existing tutorials (e.g., a healing tool tutorial) are not dynamically adaptive to different images or other tutorial information. For example, an existing tutorial demonstrates the healing process on pre-selected images. Tool parameters, such as unwanted regions, healing-source regions, and brush size are pre-crafted by experts so that the output images are perfect. Using static existing tutorials, however, may not effectively provide guidance that adequately transfers knowledge of the editing tool to a user or improve a user's understanding of how to use the tool.

Moreover, for a spot healing tool, the selection of the source "spot" region (e.g., scar or blemish) and the target "healing-source" region is driven by the image content and this is highly likely to change across different types of images. For example, while removing blemishes from a face, the healing parameters may vary based on the face's position, posture, and expressions. This means that a tutorial that works well for one image, may not produce desired results on some other images. Usage data from graphics editing systems has also shown that on-boarding workflows are most effective when tutorials include actual user content.

Additionally, on-boarding workflows can also be poorly incorporated into the graphics editing system or not strategically presented to the user, in that, conventional graphical user interfaces do not adequately highlight tutorials or other assistive content for premium editing tools in a manner that stands out to the user. As such, users may have to manually trigger tool tutorials or sometimes even turn to searching for tutorials online. For example, user feedback has shown that users often spend hours on the internet finding ways to fix defects in their photos even though tutorials already exist in the graphics editing system. Thus, a dynamic on-boarding experience which is personalized or customized for user content can provide improvement to the current user experience on graphics editing systems. For example, the existing on-boarding experience for a spot healing tool tutorial that is based on a pre-defined set of static images can be improved to provide a more desired user experience.

Customizing the tools tutorial can be based on tool workflows that improve on existing tool workflows. In particular, the tool workflows are a set of processing steps that improve on existing or conventional processing steps for making graphics edits with the editing tool. For example, conventional methods implement auto-detection methods of detecting spots based on feature extraction and thresholds to distinguish the spot from other facial features. However, with conventional methods, the color, shape, and lighting conditions of the spot in an image can have negative effects on the detection result. Other conventional methods include heat-mapping and adaptive-thresholds; however these conventional methods can be sensitive to noise and can confuse region around the mouth with skin. At a high level, conventional methods are based on spatial color space and thresholds to achieve the detection of spots; however the defects of the conventional methods have a high dependency on threshold values and thus lack applicability to a variety of image data. As such, a comprehensive graphics editing system with an alternative basis for executing graphics editing operations (e.g., generating customized tool tutorials based on tool workflows) can improve computing operations and interfaces that support providing tutorials that assist users in understanding the complex editing tools.

Embodiments of the technical solution can be explained by way of examples with reference to a graphics editing system with additional details provided below in the Specification and with reference to corresponding illustrations. At a high level, a graphics editing system (e.g., photo editing application) can include a large set of complex graphics editing tools. Different graphics editing tools can be used for different graphics editing functionality supported by the graphics editing systems. Usage of the different editing tools can be tracked within a graphic editing system. For example, a graphics editing system can be a freemium application or service where there exists both free and premium editing tools. For example, a spot healing editing tool can be a paid feature of the graphics editing application, where the graphics editing system also includes free graphics editing tools.

Usage data can disclose that a large number of users purchase premium editing tools (or enter into a purchase workflow) based on use of a particular editing tool (e.g., a spot healing tool). As such, in one example implementation of the present technical solution, the spot healing tool is a tool used to describe the novel technical solution because the spot healing tool is popular and helps convert users into premium users. Moreover, it is generally contemplated that tracked usage data for editing tools in a freemium application or service can be used for identifying user behavior with reference to editing tools and other operations that can support automatically generating tool tutorials as described in more detail herein.

The technical solution of the present disclosure may specifically provide a novel tool tutorial presentation workflow, such that, users are immediately aware of tools, tutorials, and the difference between free tools and premium tools for a more user friendly on-boarding experience. For example, a "Let Me Try" feature may be part of the presentation workflow and operates as an entry point for users to evaluate premium editing tools. Through the presentation workflow, the user can elect to try out the premium editing tools specifically on their own images. In particular, the user may try out the premium editing tools in advance of buying a subscription to the premium editing tool or premium services. For example, an interface element can be generated that identifies a graphics editing tool (e.g., healing brush) as a premium graphics editing tool with selectable buttons (e.g., "Let me try" or "Learn how") that trigger additional operations associated with the functionality described herein. The interface element can further include additional information or content to improve the user's awareness of different aspects of editing tool (e.g., tutorial details, purchase details, or informational content). In this regard, it becomes easier to correctly convey the positive impact of the different graphics editing tools.

The presentation workflow may also operate without user intervention. For example, upon determining that a user is working on a free editing tool, the user's content (i.e., tutorial information including image data) can be automatically used to generate a tool tutorial for another tool (e.g., a complimentary tool or premium tool) of the graphics editing system. Based on generating the tool tutorial, the tool tutorial can be selectively rendered to the user. The tool tutorial can be selectively rendered based on identified heuristics, such as, heuristics from usage data. The heuristic-based approach can be applied both for auto-generating the tool tutorial and presenting the tool tutorial, and configurable as needed. For example, the tool tutorial can be generated or presented when certain conditions have been determined (e.g., determining that the user is a freemium user and the user clicks on a particular editing tool; determining that the user has not tried a particular tool after a certain duration; or determining that a user is facing challenges while using a particular tool). Other variations and combinations of auto-generating and presenting tool tutorials based on a heuristic approach are contemplated with embodiments of the present disclosure.

As discussed, several shortcomings exist with simply using pre-defined sample images for tool tutorial, as such, the current technical solution includes providing content-adaptive tool tutorials. The technical solution can include analyzing user images and identifying if a tool workflow (i.e., a set of processing steps for the tool) can be applied to the image. The tool workflow can be used to generate tool parameters of editing tools based on the specific image and other tutorial information. For example, a spot healing tool may have a spot healing tool workflow that can be applied to an image to enhance the image. The spot healing tool workflow can include processing steps that are different from conventional known processing steps for spot healing tools, as discussed below in more detail. When the spot healing tool workflow is applied to the image, tool parameters (i.e., healing parameters) can be generated. Generally, upon determining that a tool workflow can be applied to an image, a tool tutorial is dynamically generated using the computed tool parameters. The tool tutorial can be offered to the user via multiple channels, such as, an on-boarding workflow, contextual help, and in-app messaging, etc. For a simplified explanation of the technical solution, the spot healing tool or healing tool will be used to describe example instances of the technical solution; however it is contemplated that the technical solution functionality can be applied to different types of editing tools.

At a high level, by way of example, the graphics editing system operations can include receiving tutorial information including a user-selected image that contains spots that should be corrected using a spot healing tool. If the spot healing tool is applicable to the image, the graphics editing system operations can further include automatically identifying tool parameters for the image. Identifying tool parameters can include identifying, based on the spot healing tool workflow, a spot mask, healing-source, and other tool parameters from the image and dynamically generating a tool tutorial using the tool parameters. For example, the spot healing tool workflow can include detecting a face in an image and identifying facial landmark points. Based on the face and the facial landmark points, a skin area pruning operation is executed. Spots (e.g., scars and blemishes) can be identified on the face such that a mask layer is generated for the spots. Corresponding healing-source regions can be identified for spots, where the healing-source regions support healing the spots. Spot healing tool parameters are derived based on the spots and healing-source regions. The spot healing tool parameters and image are used to generate a tutorial data file (e.g., tutorial document). The tutorial data file can be caused to be generated in different workflows associated with the graphics editing system.

Accordingly, the embodiments described herein address the above-described issues of conventional graphics editing system by providing tool tutorials based on tutorial information that is dynamically integrated into tool tutorial shells. Advantageously, content-adaptive graphics editing can be provided based on a tool tutorial (e.g., a spot healing tool tutorial) across a plurality of different types of graphics editing systems or software. Specifically, the workflows of content-adaptive graphics editing tutorials can be applied to different types of graphics editing systems and corresponding tool tutorials. The tool tutorials that are generated, as described herein, can be presented in a graphics editing system interface to provide guided assistance to users editing their own images or photographs. As such, users can use the tools tutorials interactively in the different types of graphics editing systems which would improve the overall user understanding of different editing tools and also improve the user graphics editing experience.

Graphics Editing System

Figure 1B:
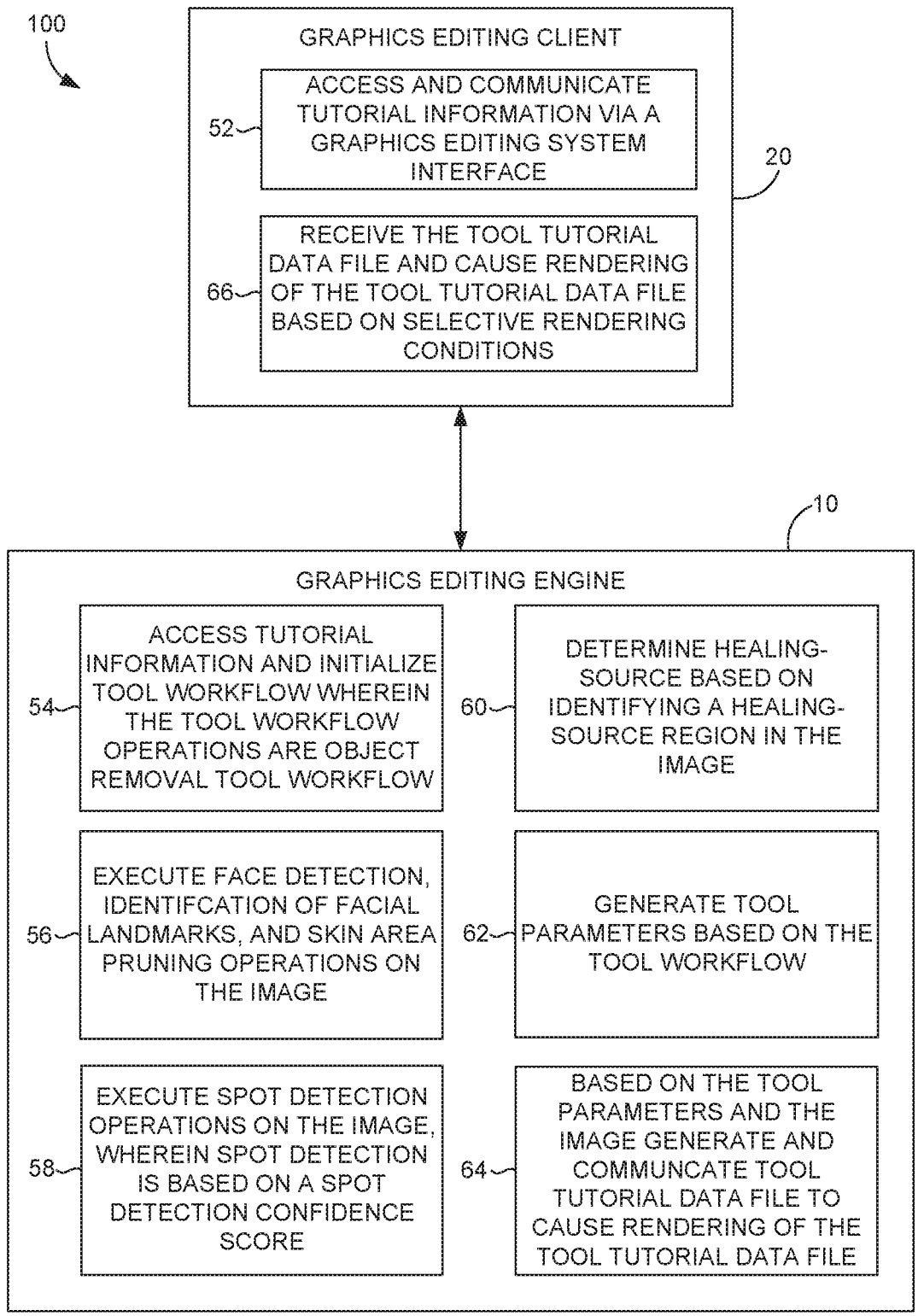

With reference to FIGS. 1A and 1B, FIGS. 1A and 1B illustrate an example graphics editing system 100 in which methods of the present disclosure may be employed. In particular, FIGS. 1A and 1B show a high level architecture and operations of the graphics editing system 100 in accordance with implementations of the present disclosure. Among other engines, managers, generators, selectors, or components not shown (collectively referred to herein as "components"), the technical solution environment of graphics editing system 100 includes a graphics editing engine 110 (including graphics editing system operations 112, and graphics editing system interface 114), graphics editing engine input data 120 (including tutorial information 122, and tool tutorial shells 124), graphics engine output data (including graphics engine system operations data 132, and tool tutorial data file 134), tool parameters engine 140 (including tool parameters models 142, tool workflows 144, and tool parameters generator 144), graphics editing client 180 (including graphics editing interface 182, and graphics editing system operations 184) and network 190.

The components of the graphics editing system 100 may communicate with each other over one or more networks (e.g., public network or virtual private network "VPN") as shown with network 190. The network 190 may include, without limitation, one or more local area networks (LANs) and/or wide area networks (WANs). The graphics editing client 180 may be a client computing device that corresponds to the computing device described herein with reference to FIG. 7. Graphics editing system operations (e.g., graphics editing system operations 112 and graphics editing system operations 184) can be carried out by a processor executing instructions stored in memory as further described with reference to FIG. 7.

At a high level, graphics editing system 100 includes a graphics editing engine 110 and a graphics editing client 180 that receives and communicate tutorial information 122, such that, the graphics editing engine processes graphics editing engine input data 120, including the tool tutorial shells 124. Based on the graphics editing engine 110 processing input data 120, the tool parameters engine 140 can generate tools parameters such that the graphics editing engine 110 generates graphics engine output data (e.g., graphics editing system operations data 132, tool tutorial data file 134) based on the tutorial information 122, tool tutorial shells 124, and the tool parameters.

Accordingly, the components of the graphics editing system can be used to execute graphics editing system operations that provide tool tutorials based on tutorial information that is dynamically integrated into tool tutorial shells. In operation, an image is received in association with a graphics editing application. Tool parameters are generated based on processing the image. The tool parameters are generated for an editing tool of the graphics editing application. The editing tool (e.g., object removal tool or spot healing tool) can be a premium version of a simplified version of the graphics editing tool in a freemium application service. Based on the tool parameters and the image, a tool tutorial data file is generated by incorporating the tool parameters and the image into a tool tutorial shell. The tool tutorial data file can be selectively rendered in an integrated interface of the graphics editing application.

With reference FIG. 1B, the graphics editing system 100, graphics editing engine 10, and graphics editing client 20 correspond to the components described with reference to FIG. 1A. At a high level, at step 52, the graphics editing client accesses and communicates input data (e.g., tutorial information, image data, metadata, and other user content) via an application interface. The input data can be communicated from the graphics editing client 20 to the graphics editing engine 10 such that the input data is stored in the graphics editing engine. The graphics editing client can be a client device that uses an application or service to access a graphics editing application, some or all of the graphics editing engine 10 functionality can be executed locally on the client device or remotely on a server support the application or service associated with the input data. Input data can also include tool tutorial shells (e.g., tool tutorial shells 124) that are used to generate the tool tutorial data file (e.g., tool tutorial data file 134). At step 54, the graphics editing engine 10 accesses tutorial information (e.g., an image) and initializes tool workflows. The tool workflow can be for an object removal tool (e.g., spot healing tool). The tool workflow is a set of processing steps used to implement the tool. The tool workflows can be associated with associated with machine learning models that support generating tool parameters for the tool and further support refining the how the tool parameters are generated.

At steps 56, 58, and 60 the graphics editing engine 10 executes operations of the tool workflow that support generating the tool parameters (e.g., using the tool parameters engine 140). Specifically, generating the tool parameters based executing the set of processing steps includes accessing a measurable identifier of a tool parameter. The measurable identifier corresponds to one or more steps of the set of processing steps.

For example, the measurable identifier of a tool parameter may be an x and y axis offset of the spot region or a healing region. A quantified value for the measurable identifier is determined based on executing the one or more steps on image data of the image. For example, an offset value in the x axis and y axis are for a spot region or healing region are identified and stored the tool parameters. If additional steps in the tool workflow are associated with the tool parameter, the tool parameter can be incrementally updated as each step of the tool workflow is performed. It contemplated that different types of variations and combination of tool parameters can be defined for one or more processing steps of a tool workflow, such that, upon executing one or more steps on image data of an image, the resulting quantified value is corresponds to the tool parameter as a measurable identifier.

The tool workflow are initially described at a high level and discussed in more detail below with reference to corresponding figures. At step 56, the face detection, identification of facial landmarks, and skin area pruning operations are performed on the image. At step 58, the graphics editing engine 10 executes spot detection operations on the image. It is contemplated that determining that the spot has been detected is based on a spot detection confidence score. The spot detection confidence score is a quantified value for determining whether a candidate spot is selected as a spot or not a spot. Different scoring models can be used for scoring candidate spots and selecting a subset of the candidate spots based on the spot detection confidence score and spot detection confidence score threshold.

At step 60, the graphics editing engine 10 determines a healing-source for a spot, based on identifying a healing-source region in the image. Applying the specific tool workflow operations can be performed using a tool parameters engine (e.g., tool parameters engine 140) that generates the tool parameters. The tools parameters can include the identified face, the facial landmarks, the pruned area of the skin, etc. It is contemplated that other editing tools can have different tool parameters derived from their corresponding tool workflows.

At step 62, the graphics editing engine 10 generates a tool parameters based on the tool workflow operations performed on the image. At step 64, based on the tool parameters and image, the graphics editing engine 10 generates and communicates a tutorial data file to cause rendering of the tutorial data file. At step 66, the graphics editing client receives the tool tutorial data file and causes rendering of the tool tutorial data file based on selective rendering conditions.

Figure 2B:
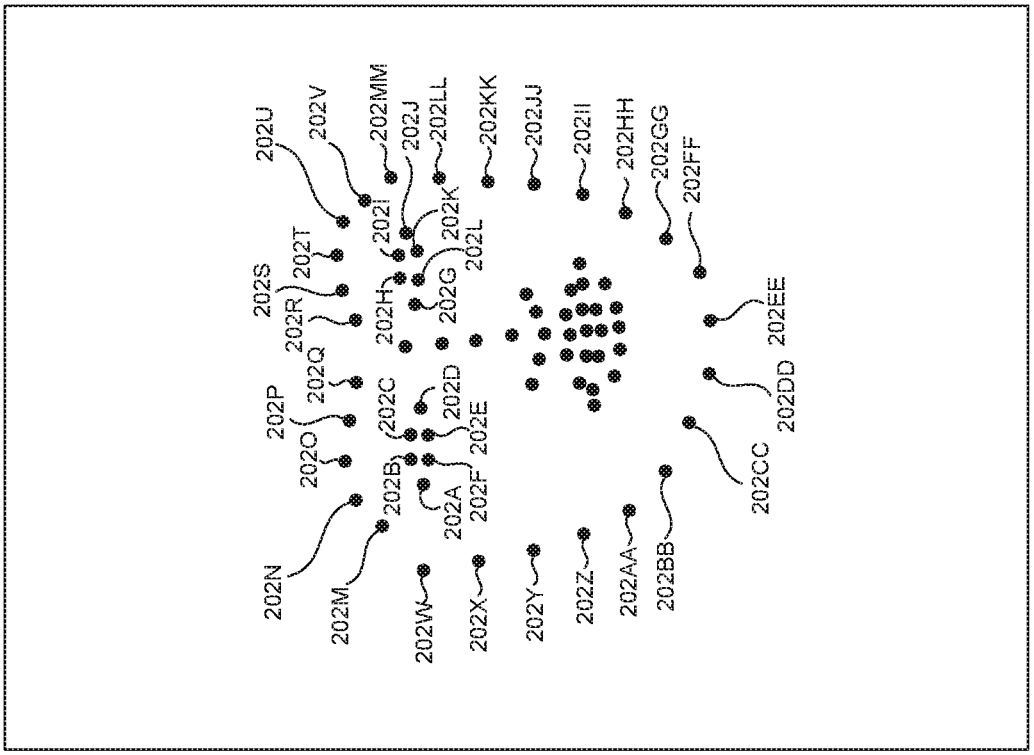
Figure 2A:
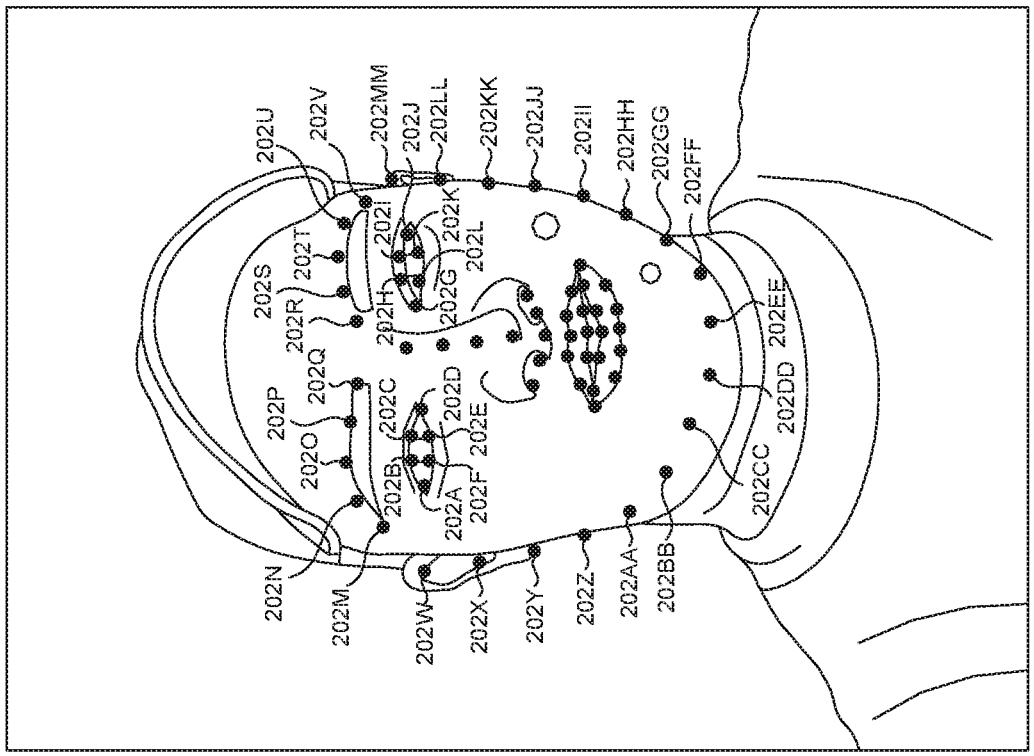

With reference to FIGS. 2A-2F, the graphics editing system operations can generate tool parameters from a tool workflow such that the tool parameters and the tutorial information are utilized to generate the tool tutorial data file. By way of example, graphic editing system operations data (e.g., graphics editing system operations data) that is data generated when executing the tool workflow is illustrated in FIGS. 2A-2E for a spot healing tool workflow. The spot healing tool workflow, as summarized above, includes performing spot tool workflow operations that include face detection and identifying facial landmarks, and skin area pruning based on the identified facial landmarks. Detecting facial landmarks is a subset of the shape prediction problem. In this regard, the graphics system operations include a two-part process of localizing the face in the image and then detecting the key facial structure on the face region of interest. The facial landmark points are used to extract the boundaries for facial region as well as separating facial landmarks. As shown in FIGS. 2A and 2B, a face (e.g., face boundary in FIG. 2A) can be detected with a plurality facial landmark points (e.g., facial landmarks points 202A-202MM in FIG. 2B).

The tool workflow operations can include the graphic editing engine 10 operating as a face detector using histograms of oriented gradients (HOG) features combined with pre-trained linear classifier to detect the face boundaries in the image. The graphics editing engine 10 can include a facial analysis machine learning model (e.g., tool parameters models 142) that supports detecting facial features and generating a face detection confidence score based on the prediction of the facial analysis machine learning model whether or not a face has been detected. In one implementation, for detecting facial features, the graphics editing engine 10 implements a one millisecond face alignment with an ensemble of regression trees algorithm. In this implementation, detecting facial features is performed using a general purpose cross-platform software library (e.g., Dlib library) to estimate the location of 68 (x, y) coordinates that map to facial structures of the face.

Facial landmark detection can include identifying key landmarks on a face. Facial landmarks are used to localize and represent salient regions of the face, such as, eyes, eyebrows, nose, mouth and jawline. The face and features points that are detected as illustrated in FIG. 2B, wherein the facial features correspond to clusters of facial landmark points. For example, a first cluster of facial landmark points correspond to a first eye and a second cluster of landmark points correspond to a second eye. If it is determined that a face has been detected (e.g., based on a face detection confidence score), then additional graphics editing engine operations can be performed on the image (including creating an object removal tool tutorial or spot-healing tool tutorial for the image).

Figure 2C:
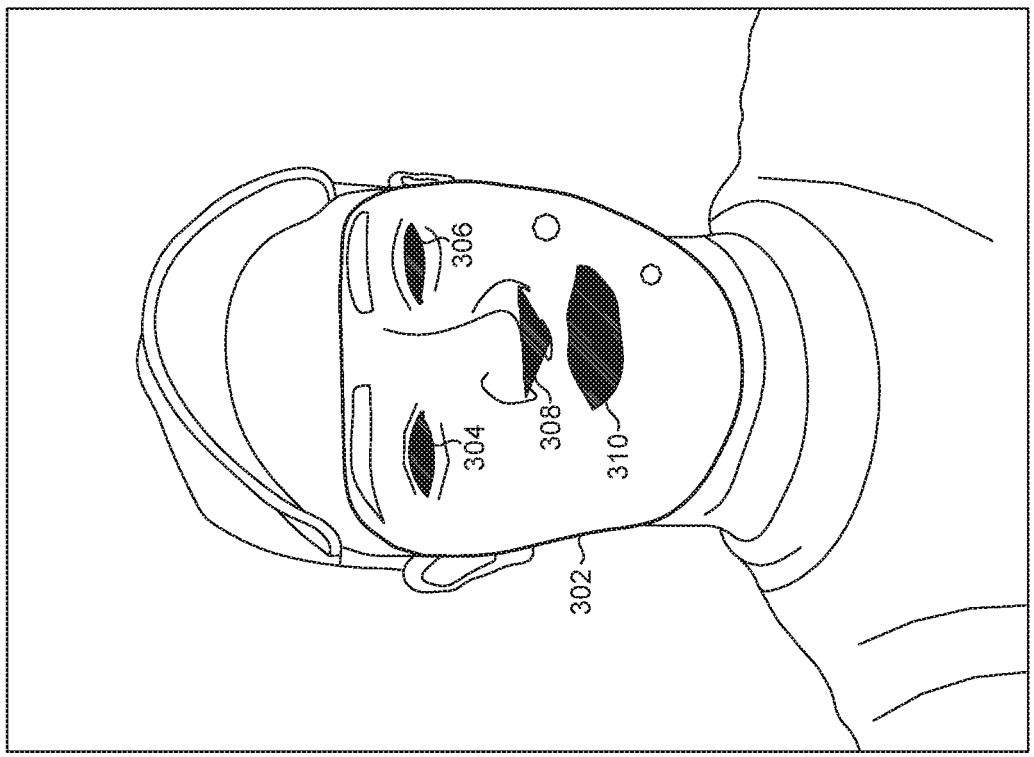

Turning to FIG. 2C, the tool workflow operations further includes skin area pruning based on identified facial landmarks. By way of context, the graphics editing operations support identifying facial spots and corresponding healing-sources. Identification of facial spots can specifically be performed to reduce a number of false positives. Conventionally, in facial analysis operations, facial features such as nostrils, corners of eyes, and mouth may be misidentified as facial-spots candidates. With embodiments of the present disclosure, in order to prevent false positive scenarios, the graphics editing operations include skin area pruning on a detected face. Skin area pruning includes segmenting out regions of the face including eyes, nostrils, and mouth regions.

As illustrated in FIG. 2C, the pruned region is enclosed in 302 with facial features including a first eye region 304, a second eye region 306, a bottom region of the nostrils 308, and lip region 310 pruned out. Advantageously, removing some the facial regions helps in boosting the accuracy of additional graphics editing operations where the graphics editing operations are executed on pruned regions to predict a spot (e.g., blemish or scar) region and corresponding healing-source region to heal the spot.

The tool workflow operations further include detecting spots (e.g., scar and blemishes) and generating an accurate mask for the spots. As shown in FIG. 2A, the facial landmark detection operations support extracting boundaries for a facial region including separating the eyes and a hair regions of the face. The facial landmark detection operations additionally support segregating a skin area accurately from non-skin regions of the face. The tool workflow operations additionally include using a deep-learning based classifier to detect the presence of facial spots. In particular, the tool workflow operations can be implemented based on convolutional neural networks (CNN) and a classifier. A CNN can be used as a feature extractor and the classifier used to distinguish spots from normal regions in a face and generate a mask layer covering the spot.

With reference to FIG. 2D, operationally, spot detection (illustrated in 400A) and mask generation (illustrated in 400B) can be performed as part of the tool workflow. For detecting spots and generating masks, the tool workflow includes feeding an input image to the CNN to generate a convolution feature map. From the convolution feature map, the tool workflow operations support identifying candidate spot regions (e.g., candidate spot 402 and candidate spot 404). The candidate spot regions can be warped into a pre-defined shape (e.g., a square). RoI pooling (also known as region of interest pooling) is an operation that supports object detection tasks using convolution neural networks. For example, to detect multiple spots in a single image, RoI pooling can be used to perform max pooling of input of non-uniform size to obtain fixed-size feature maps. As such, using a RoI pooling layer, the tool workflow operations support reshaping the candidate spots into a fixed size so that the candidate spot can be fed into a fully connected layer. From the RoI feature vector, a softmax layer can be used to predict and classify a candidate spot as a spot or a non-spot of the proposed region and also the mask region for the spot. It is contemplated that the workflow operations can operate based on a Faster R-CNN includes two networks (i.e., a region proposal network for generating region proposal and a network using these proposal to detect objects). The Faster R-CNN can replace a selective search algorithm that is applicable on the feature map to identify the region proposals.

The tool workflow operations further include generating a feature map. A pre-trained modified CNN for classification and detection (e.g., VGG16 model) can be used to generate the feature map. The feature map can be augmented with images having facial regions. Advantageously, focus on facial regions only can yield more efficient and accurate predictions of spots. It is contemplated that the CNN and spot detecting can be associated with a spot detection confidence score that represents a quantified confidence that a spot has been detected. Based on the spot detection confidence score (e.g., if the probability value is less than a pre-defined threshold) a determination can be made that no spots exist in the image. Remedial operations can be performed at that time including skipping the generation of a tutorial, prompting the user for another image, and communicating an informational interface element that explains the current status of the tutorial.

Figure 2E:
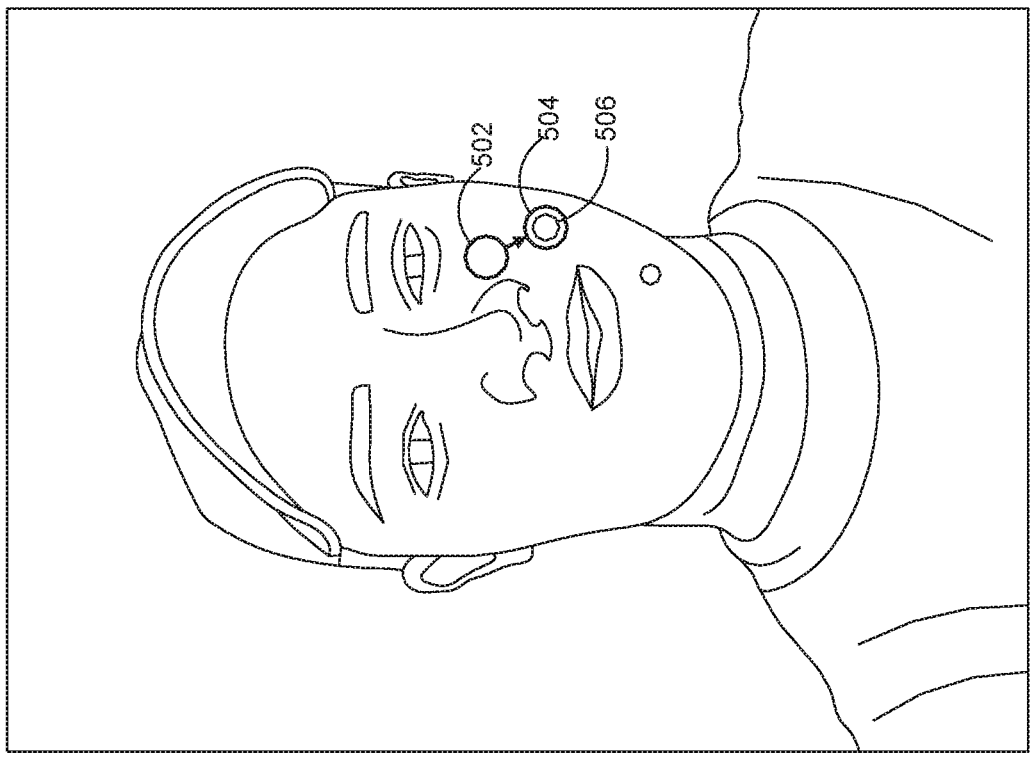

With reference to FIG. 2E, based on the spot-masks healing-source regions can identified for the corresponding spots (e.g., healing region 502, spot region 504, and spot 506). As such, the tool workflow operations includes identifying a healing-source region to be used for healing a spot (or spot region). Operationally, a mask layer or mask region that has been identified is accessed. A healing brush algorithm (e.g., a healing brush algorithm for a content-adaptive spot healing tool tutorial) is applied to any identified spots. For each identified spot, the tools workflow operations compute a set of boundary pixels corresponding to the mask of the spot. The tool workflow operations then evaluate the set of boundary pixels to identify a healing-source region. In addition, the tool workflow operations further include automatically finding a healing-source region based on random angles and offsets from the spot, and further based on evaluating a candidate healing-source region based on the standard deviation of boundary pixels between a candidate healing-source region and a target spot.

The healing brush algorithm can specifically be configured to improve the accuracy and to reduce false-positives. The healing brush algorithm can be configured to exclude any candidate healing-source regions that meet certain predefined conditions. For example, a first condition can exclude a candidate healing-source region if an overlap between a candidate healing-source boundary box and a facial landmark boundary box (e.g., identified during skin pruning operations) is non-empty; and a second condition can exclude a candidate healing-source region if the candidate healing-source region boundary box (e.g., identified during deep learning spot detection and masking) is outside of a skin area. Other variations and combinations of exclusion conditions for improving accuracy are contemplated with embodiments of the present disclosure.

The healing brush algorithm can further include an increase in an error threshold between a healing-source region and a spot boundary pixels. For example, a max diff of 1/255 can be a defined error threshold. Any candidate healing-source region where the boundary pixels differ more than the defined error threshold are rejected. If a candidate healing-source region does not meet the defined criteria, the tools workflow operations advances to a next identified spot. Upon analyzing all identified spots without identifying a healing-source region, the image can be rejected as a candidate image for generating the tool tutorial. If a healing-source region is identified for a spot, then the healing parameters corresponding to the spot are generated and provided for generating the tool tutorial.

With reference to FIG. 2F, FIG. 2F illustrates example tool parameters for a spot healing tool. The tool parameters are represented in a human-readable and machine-readable markup language document (e.g., tool parameters 600). The textual data format are used to represent different types of tool parameters based on tutorial information and data from the tool workflow. The tool parameters representation can be divided into markup and content including different tags, elements, and attributes corresponding to the tool parameters. For example, tool parameters markup and content can include "RetouchAreas" 602, "SourceX" 604, "OffsetY" 606, and mask "SizeX" 608, and "SizeY" 610. Other variations and combinations of tool parameter data representations in markup and content of markup language are contemplated with embodiments of the present disclosure.

Turning to FIG. 3, FIG. 3 illustrates an example tool tutorial data file based on a tool tutorial shell that has been integrated with tool parameters. The graphics editing engine 10 is configured for generating the tool tutorial data file. The tool tutorial data file is generated based on tool tutorial shells. The tool tutorial shell can refer to a structured document (e.g., a tutorial structured document for adaptive tutorials) which can be cause to be rendered in a tool tutorial interface that is integrated into a graphics editing application. The tool tutorial data file can be in a portable format such that it can be rendered in different contexts. For example, the tutorial data file can be in PTF file extension, where tutorial data file includes audio and video functionality. The tool tutorial data file can include distinct portions (e.g., chapters and sections) where each distinct portion can include one or more edit steps. In one implementation, there exists a one-to-one mapping between the tutorial steps and the distinct portions. The tutorial steps and integrated tool parameters are represented in a human-readable and machine-readable markup language document (e.g., tool tutorial data file 700). The textual data format are used to represent different types of tutorial steps based on tutorial information and data from the tool workflow. The tool parameters representation can be divided into markup and content including different tags, elements, and attributes corresponding to the tool parameters. For example, step sentence text 302 include tool tutorial shell text that can be integrated with mask data (e.g., SizeX 304 that corresponds to SizeX 608 of the tool parameters data representation. It is contemplated that additional informative steps can be appended to a generated tool tutorial data file to allow user to continue editing and further refine the image associated with the tool tutorial data file. Other variations and combinations of toot tutorial data file representations are contemplated with embodiments of the present disclosure.

The tutorial data file can be communicated to be rendered in a graphics editing application interface. The tutorial data file can be selectively rendered in an integrated tutorial interface or some other interface that supports rendering the tutorial data file. The tutorial data file can be selectively rendered. Selectively rendering the tutorial data file can be based on a several different approaches. For example, a heuristic approach can be used, such that the tutorial data file is only shown if certain conditions are met. Several different conditions are contemplated with embodiment of the present disclosure. Example conditions include determining that a user is a freemium user who has clicked on a heal tool icon, determining that the user has not tried the healing tool after a certain duration, and determining that the user is a beginner and is facing trouble while using the healing tool).

Accordingly, the embodiments of the technical solutions described herein provide improvements over conventional systems by providing content-adaptive tutorials for editing tools of a graphics editing systems. For example, the editing tool can be an object removal tool or spot healing tool that support removing unwanted spots in an image. The editing tool can include a tool workflow with processing steps (e.g., spot healing tool workflow that automatically determines the spot-mask and healing-source) that are used to dynamically generate to tool tutorial (e.g., tool tutorial data file). Moreover, the spot healing tool workflow include unconventional steps for automatically determining spots (e.g., scars and blemishes) in an image based on deep-learning and skin area pruning and steps for identifying a healing-source region to fix the spot region. A tool tutorial that is generated is caused to be rendered to the user in different user contexts.

Exemplary Methods

Figure 4:
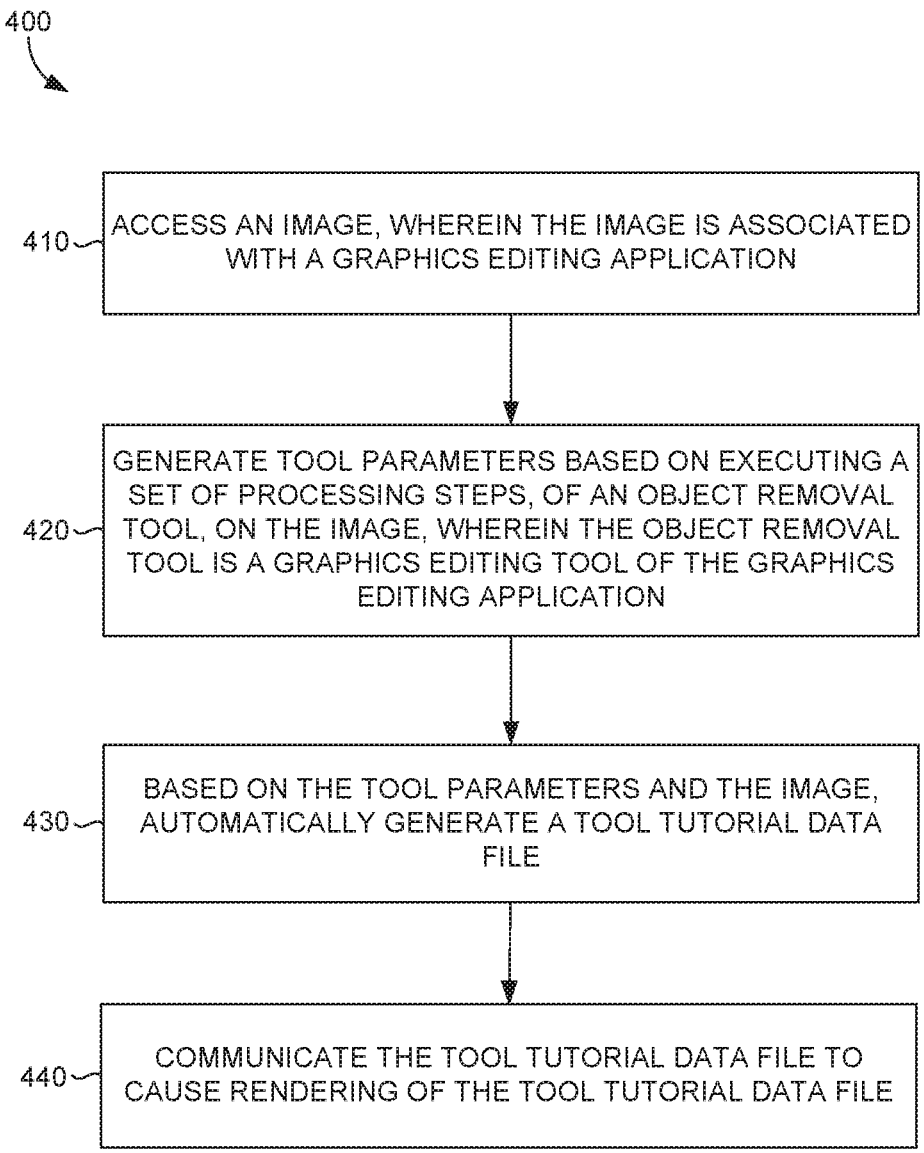
FIG. 4 provides a first example method of providing graphics editing system operations, in accordance with aspects of the technology described herein.
Figure 5:
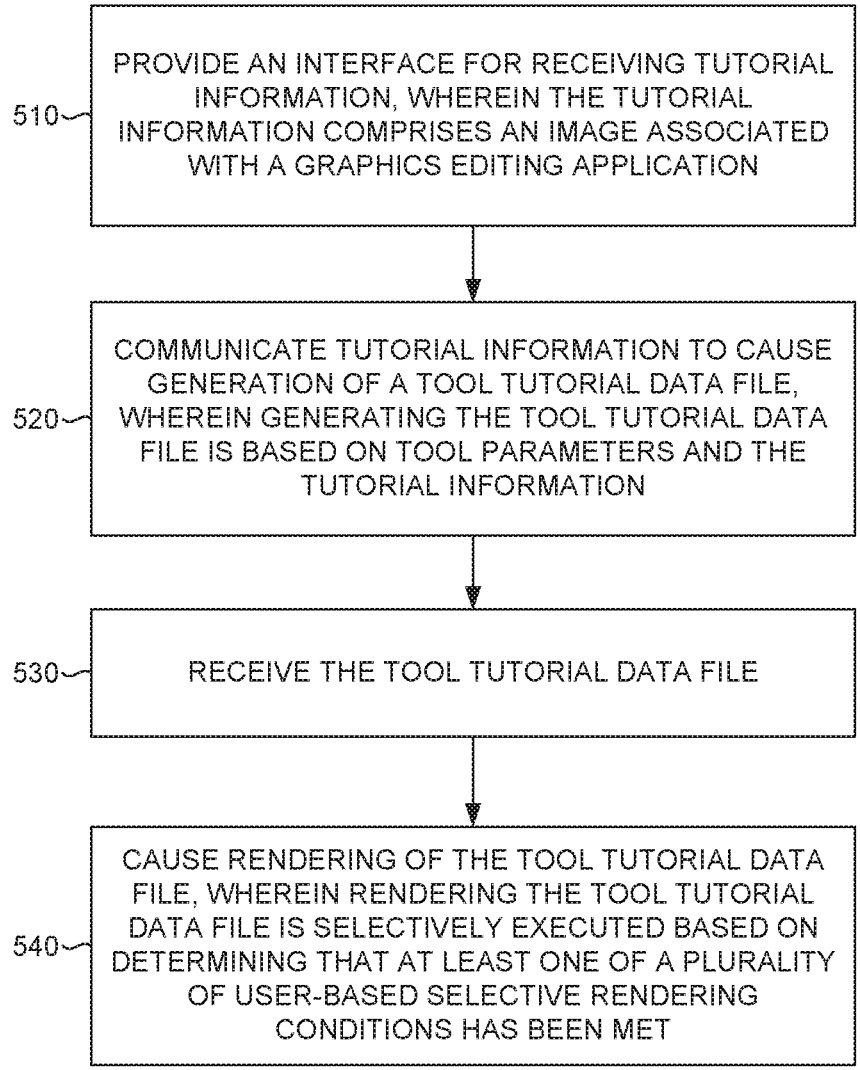
FIG. 5 provides a second example method of providing graphics editing system operations, in accordance with aspects of the technology described herein.

With reference to FIGS. 4, 5, and 6 are flow diagrams illustrating methods for providing tool tutorials based on tutorial information that is dynamically integrated into tool tutorial shells using graphics editing system operations in a graphics editing systems. The methods may be performed using the graphics editing system described herein. In embodiments, one or more computer storage media having computer-executable instructions embodied thereon that, when executed, by one or more processors can cause the one or more processors to perform the methods in the graphics editing system.

Turning to FIG. 4, FIG. 4 is a flow diagram illustrating a method 400 for generating content-adaptive tool tutorials based on graphics editing system operations. Initially, at step 410, access an image. The image is associated with a graphics editing application. At step 420, generate tool parameters based on executing a set of processing steps (i.e., tool workflow) of an object removal tool associated with the graphics editing application. The object removal tool is graphics editing tool of the graphics editing application. At step 430, based on the tool parameters and the image, automatically generate a tool tutorial data file. Automatically generating the tutorial is based on integrating the tool parameters and image data of the image into a tool tutorial shell associated with the object removal tool. At step 440, communicate the tool tutorial data file to cause rendering of the tool tutorial data file.

Turning to FIG. 5, FIG. 5 provides a flow diagram illustrating a method 500 for providing content-adaptive tool tutorials based on graphics editing system operations. Initially at step 510, provide an interface for receiving tutorial information. The tutorial information comprises an image associated with a graphics editing application. At step 520, communicate tutorial information to cause generation of a tool tutorial data file. The tool tutorial data file is generated based on tool parameters and the tutorial information. At step 530, receive the tool tutorial data file. At step 540, cause rendering of the tool tutorial data file. Rendering the tool tutorial data file is selectively executed based on determining that at least one of a plurality of user-based selective rendering conditions has been met. In addition, the tool tutorial data file is caused to be generated and then rendered on an interface that is integrated with the graphics editing application based on any of the following: determining that the user is a freemium user and the user clicks on a particular editing tool; determining that the user has not tried a particular tool after a certain duration; or determining that a user is facing challenges while using a particular tool.

Turning to FIG. 6, FIG. 6 a flow diagram illustrating a method 600 for providing content-adaptive tool tutorials based on graphics editing system operations. Initially at step 610, generate tool parameters based on executing a set of processing steps of a graphics editing tool associated with a graphics editing application. Generating the tool parameter based on executing the set of processing steps includes accessing a measurable identifier of a tool parameter, wherein the measurable identifier corresponds to one or more steps of the set of processing steps and determining a quantified value for the measurable identifier based on executing the one or more steps on the image data of the image. At step 620, access a tool tutorial shell. The tool tutorial shell is in a portable tutorial format comprising chapters and section of tutorial steps. At step 630, generate a tool tutorial data file based on mapping the tool tutorial steps to the tool parameters and image data of the image. Generating a tool tutorial data file is based on integrating the tool parameters and image data of the image into a tool shell associated with the graphics editing tool.

Exemplary Operating Environment

Figure 7:
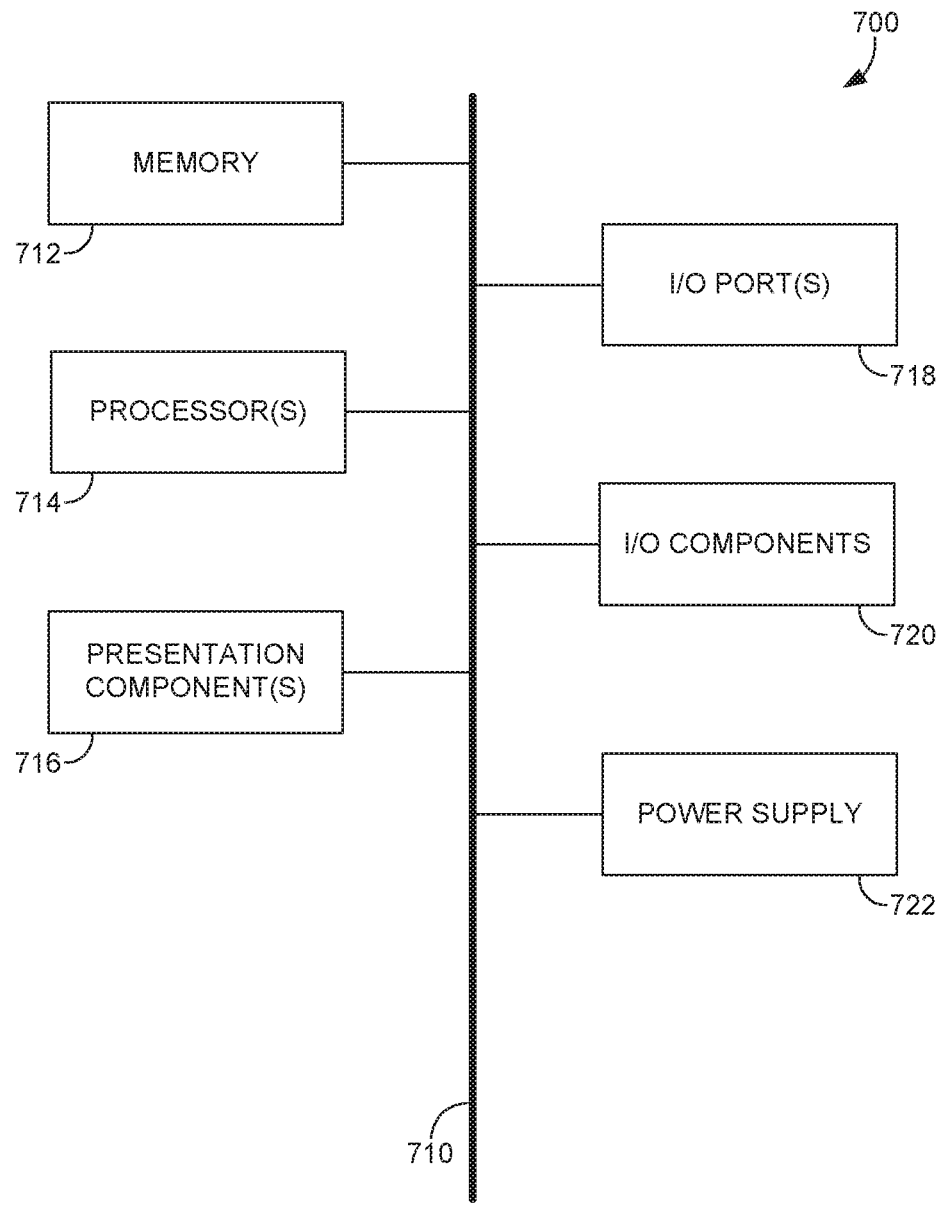
FIG. 7 is a block diagram of an example computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 7 in particular, an example operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an API library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

The technical solution system can further include a machine learning system. A machine-learning system may include machine-learning tools and training components. Machine-learning systems can include machine-learning tools that are utilized to perform operations in different types of technology fields. Machine-learning systems can include pre-trained machine-learning tools that can further be trained for a particular task or technological field. At a high level, machine-learning is a field of study that gives computers the ability to learn without being explicitly programmed. Machine-learning explores the study and construction of machine-learning tools, including machine-learning algorithm or models, which may learn from existing data and make predictions about new data. Such machine-learning tools operate by building a model from example training data in order to make data-driven predictions or decisions expressed as outputs or assessments. Although example embodiments are presented with respect to a few machine-learning tools, the principles presented herein may be applied to other machine-learning tools. It is contemplated that different machine-learning tools may be used, for example, Logistic Regression (LR), Naive-Bayes, Random Forest (RF), neural networks (NN), matrix factorization, and Support Vector Machines (SVM) tools may be used for addressing problems in different technological fields.

In general, there are two types of problems in machine-learning: classification problems and regression problems. Classification problems, also referred to as categorization problems, aim at classifying items into one of several category values (for example, is this email SPAM or not SPAM). Regression algorithms aim at quantifying some items (for example, by providing a value that is a real number). Machine-learning algorithms can provide a score (e.g., a number from 1 to 100) to qualify one or more products as a match for a user of the online marketplace.

Machine-learning algorithms utilize the training data to find correlations among identified features (or combinations of features) that affect an outcome. A trained machine-learning model may be implemented to perform a machine-learning operation based on a combinations of features. An administrator of a machine-learning system may also determine which of the various combinations of features are relevant (e.g., lead to desired results), and which ones are not. The combinations of features determined to be (e.g., classified as) successful are input into a machine-learning algorithm for the machine-learning algorithm to learn which combinations of features (also referred to as "patterns") are "relevant" and which patterns are "irrelevant." The machine-learning algorithms utilize features for analyzing the data to generate an output or an assessment. A feature can be an individual measurable property of a phenomenon being observed. The concept of feature is related to that of an explanatory variable used in statistical techniques such as linear regression. Choosing informative, discriminating, and independent features is important for effective operation of the machine-learning system in pattern recognition, classification, and regression. Features may be of different types, such as numeric, strings, and graphs.

The machine-learning algorithms utilize the training data to find correlations among the identified features that affect the outcome or assessment. The training data includes known data for one or more identified features and one or more outcomes. With the training data and the identified features the machine-learning tool is trained. The machine-learning tool determines the relevance of the features as they correlate to the training data. The result of the training is the trained machine-learning model. When the machine-learning model is used to perform an assessment, new data is provided as an input to the trained machine-learning model, and the machine-learning model generates the assessment as output.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method, the method comprising:
   accessing an image, wherein the image is associated with a graphics editing application;
   based on the image, determining whether a spot healing tool workflow is applicable to the image, wherein the spot healing tool workflow comprises a set of processing steps of a spot healing tool, wherein when the spot healing tool workflow is not applicable to the image, a content-adaptive tutorial is not generated for the image, and when the spot healing tool workflow is applicable to the image, the content-adaptive tutorial is generated for the image,
   wherein determining whether the spot healing tool workflow is applicable to the image is based on analyzing whether tool parameters with placeholders in a tool tutorial shell can be generated for the image, the tool parameters are associated with detecting a face, executing skin area pruning, and detecting one or more spots;
   based on determining that the spot healing tool workflow is applicable to the image, generating the tool parameters based on executing the set of processing steps of the spot healing tool workflow,
   wherein generating the tool parameters is based on the one or more spots of the image and the one or more healing source regions;
   based on the tool parameters and the image, automatically generating a tool tutorial data file associated with the spot healing tool, wherein automatically generating the tutorial data file is based on integrating the tool parameters and image data of the image into the tool tutorial shell that supports generating content-adaptive tool tutorials specific to image data of images and their corresponding tool parameters; and
   communicating the tool tutorial data file to cause rendering of the tool tutorial data file.

2. The method of claim 1, wherein the tool tutorial shell comprises distinct portions corresponding to tutorials steps that are integrated with the tool parameters and image data of the image, wherein a tool parameter is a measurable identifier having a quantified value for one or more steps of the set of processing steps of a tool workflow of the graphics editing tool.

3. The method of claim 1, wherein generating the tool parameters based on the set of tool processing steps comprises:
   accessing a measurable identifier of a tool parameter, wherein the measurable identifier corresponds to one or more steps of the set of processing steps; and
   determining a quantified value for the measurable identifier based on executing the one or more steps on image data of the image.

4. The method of claim 1, wherein the set of tool processing steps further comprises:
   detecting the face in the image;
   identifying a plurality of facial landmark points of the face;
   based on the face and the plurality landmark, executing skin area pruning on the image;
   detecting the one or more spots on the image;
   generating a mask for the one or more spots of the image;
   identifying the one or more healing-source regions of the image, wherein the one or more healing-source regions support healing corresponding one or more spots of the image; and
   generating the tool parameters based on the one or more spots of the image and the one or more healing-source regions, wherein the tool parameters are healing parameters for the spot healing tool.

5. The method of claim 1, wherein automatically generating the tool tutorial data file is based on integrating the tool parameters and image data of the image into the tool tutorial shell associated with the graphics editing tool.

6. The method of claim 1, wherein integrating the tool parameters and the image into the tool tutorial shell further comprises:
   accessing the tool tutorial shell, wherein the tool tutorial shell is in a portable tutorial format comprising chapters or sections of tutorial steps; and
   generating the tool tutorial data file based on mapping the tutorial steps to the tool parameters and image data of the image.

7. The method of claim 1, wherein causing the rendering of the tool tutorial data file is based on selectively rendering the tutorial data file based on determining that at least one of a plurality of user-based selective rendering conditions has been met; or
   wherein the tool tutorial data file is caused to be generated and then rendered on an interface that is integrated with the graphics editing application based on:
      determining that the user is a freemium user and the user clicks on a particular editing tool;
      determining that the user has not tried a particular tool after a certain duration; or
      determining that a user is facing challenges while using a particular tool.

8. A computerized system comprising:
   accessing an image, wherein the image is associated with a graphics editing application;
   based on the image, determining whether a spot healing tool workflow is applicable to the image, wherein the spot healing tool workflow comprises a set of processing steps of a spot healing tool, wherein when the spot healing tool workflow is not applicable to the image, a content-adaptive tutorial is not generated for the image, and when the spot healing tool workflow is applicable to the image, the content-adaptive tutorial is generated for the image,
   wherein determining whether the spot healing tool workflow is applicable to the image is based on analyzing whether tool parameters with placeholders in a tool tutorial shell can be generated for the image, the tool parameters are associated with detecting a face, executing skin area pruning, and detecting one or more spots;

based on determining that the spot healing tool workflow is applicable to the image, generating the tool parameters based on executing the set of processing steps of the spot healing tool workflow, wherein generating the tool parameters is based on the one or more spots of the image and the one or more healing source regions;

based on the tool parameters and the image, automatically generating a tool tutorial data file associated with the spot healing tool, wherein automatically generating the tutorial data file is based on integrating the tool parameters and image data of the image into the tool tutorial shell that supports generating content-adaptive tool tutorials specific to image data of images and their corresponding tool parameters; and communicating the tool tutorial data file to cause rendering of the tool tutorial data file.

9. The system of claim 8, wherein the tool tutorial shell comprises distinct portions corresponding to tutorials steps that are integrated with the tool parameters and image data of the image, wherein a tool parameter is a measurable identifier having a quantified value for one or more steps of the set of processing steps of a tool workflow of the object removal tool.

10. The system of claim 8, wherein generating the tool parameters based on executing the set of processing steps comprises:

accessing a measurable identifier of a tool parameter, wherein the measurable identifier corresponds to one or more steps of the set of processing steps; and determining a quantified value for the measurable identifier based on executing the one or more steps on image data of the image.

11. The system of claim 8, wherein automatically generating the tutorial data file is based on integrating the tool parameters and image data of the image into the tool tutorial shell associated with the object removal tool, wherein the tool tutorial shell comprises distinct portions corresponding to tutorials steps that are integrated with the tool parameters and image data of the image.

12. The system of claim 8, wherein integrating the tool parameters and the image into the tool tutorial shell further comprises:

accessing the tool tutorial shell, wherein the tool tutorial shell is in a portable tutorial format comprising chapters or sections of tutorial steps; and generating the tool tutorial data file based on mapping the tutorial steps to the tool parameters and image data of the image.

13. The system of claim 8, wherein causing the rendering of the tool tutorial data file is based on selectively rendering the tutorial data file based on determining that at least one of a plurality of user-based selective rendering conditions has been met; or wherein the tool tutorial data file is caused to be generated and then rendered on an interface that is integrated with the graphics editing application based on:

determining that the user is a freemium user and the user clicks on a particular editing tool;

determining that the user has not tried a particular tool after a certain duration; or determining that a user is facing challenges while using a particular tool.

14. One or more computer-storage media having computer-executable instructions embodied thereon that, when executed by a computing system having a processor and memory, cause the processor to:

access an image, wherein the image is associated with a graphics editing application;

based on the image, determine whether a spot healing tool workflow is applicable to the image, wherein the spot healing tool workflow comprises a set of processing steps of a spot healing tool, wherein when the spot healing tool workflow is not applicable to the image, a content-adaptive tutorial is not generated for the image, and when the spot healing tool workflow is applicable to the image, the content-adaptive tutorial is generated for the image, wherein determining whether the spot healing tool workflow is applicable to the image is based on analyzing whether tool parameters with placeholders in a tool tutorial shell can be generated for the image, the tool parameters are associated with detecting a face, executing skin area pruning, and detecting one or more spots;

based on determining that the spot healing tool workflow is applicable to the image, generating the tool parameters based on executing the set of processing steps of the spot healing tool workflow, wherein generating the tool parameters is based on the one or more spots of the image and the one or more healing source regions;

based on the tool parameters and the image, automatically generating a tool tutorial data file associated with the spot healing tool, wherein automatically generating the tutorial data file is based on integrating the tool parameters and image data of the image into the tool tutorial shell that supports generating content-adaptive tool tutorials specific to image data of images and their corresponding tool parameters; and communicate the tool tutorial data file to cause rendering of the tool tutorial data file.

15. The media of claim 14, wherein causing the processor to access the image comprises accessing the image based on a user-selection to launch the object removal tool, wherein the object removal tool is a premium graphics editing tool for the graphics editing application, wherein the graphics editing application is provided as a freemium service comprising at least one free graphics editing tool and the premium graphics editing tool.

16. The media of claim 14, wherein the tool tutorial shell comprises distinct portions corresponding to tutorials steps that are integrated with the tool parameters and image data of the image, wherein a tool parameter is a measurable identifier having a quantified value for one or more steps of the set of processing steps of a tool workflow of the object removal tool.

17. The media of claim 14, wherein causing the processor to generate the tool parameters based on executing the set of processing steps comprises:

accessing a measurable identifier of a tool parameter, wherein the measurable identifier corresponds to one or more steps of the set of processing steps; and determining a quantified value for the measurable identifier based on executing the one or more steps on image data of the image.

18. The media of claim 14, wherein the set of processing steps comprises:

detecting the face in the image;

identifying a plurality of facial landmark points of the face;

based on the face and the plurality landmark, executing skin area pruning on the image;

detecting the one or more spots on the image;

generating a mask for the one or more spots of the image;

identifying the one or more healing-source regions of the image, wherein the one or more healing-source regions support healing corresponding one or more spots of the image; and generating the tool parameters based on the one or more spots of the image and the one or more healing-source regions, wherein the tool parameters are healing parameters for the spot healing tool.

19. The media of claim 14, wherein integrating the tool parameters and the image into the tool tutorial shell further comprises:

accessing the tool tutorial shell, wherein the tool tutorial shell is in a portable tutorial format comprising chapters or sections of the tutorial steps; and generating the tool tutorial data file based on mapping the tutorial steps to the tool parameters and image data of the image.

20. The media of claim 14, wherein causing the processor to cause rendering of the tool tutorial data file is based on selectively rendering the tutorial data file based on determining that at least one of a plurality of user-based selective rendering conditions has been met; or wherein the tool tutorial data file is caused to be generated and then rendered on an interface that is integrated with the graphics editing application based on:

determining that the user is a freemium user and the user clicks on a particular editing tool;

determining that the user has not tried a particular tool after a certain duration; or determining that a user is facing challenges while using a particular tool.

* * * * *